A. ELKIN.
COASTER BRAKE.
APPLICATION FILED AUG. 27, 1913.
1,135,883.
Patented Apr. 13, 1915.
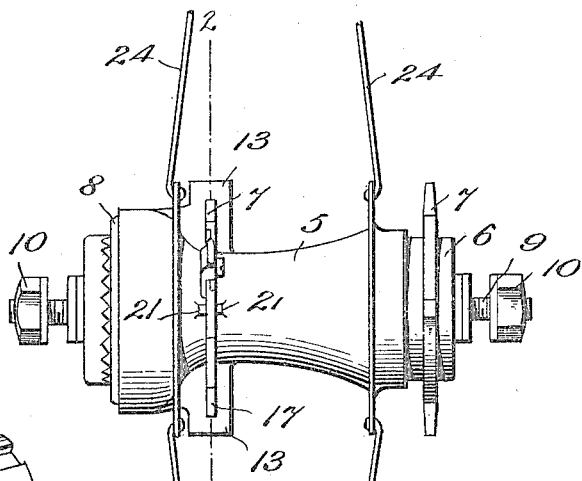
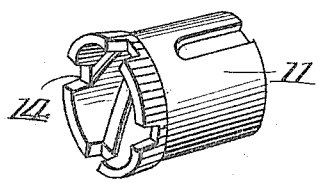
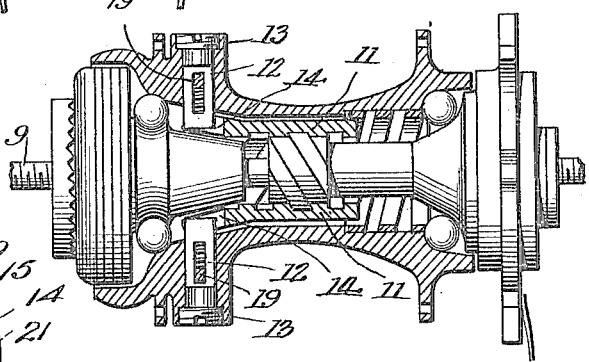
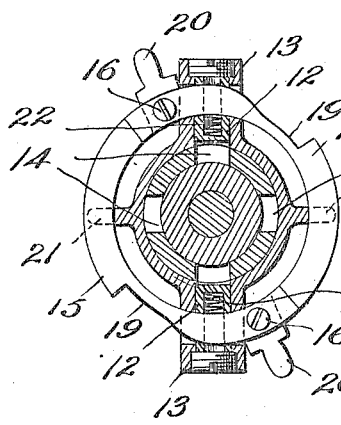
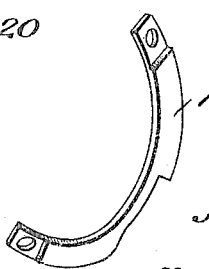
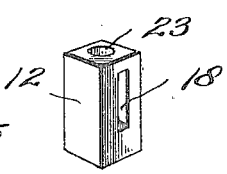
Inventor
Abraham Elkin
By Victor J. Evans
Attorney
Witnesses
James Crown
Isidor Fine

UNITED STATES PATENT OFFICE.

ABRAHAM ELKIN, OF BROOKLYN, NEW YORK.

COASTER-BRAKE.

1,135,883.    Specification of Letters Patent.    Patented Apr. 13, 1915.

Application filed August 27, 1913. Serial No. 786,971.

*To all whom it may concern:*

Be it known that I, ABRAHAM ELKIN, a subject of the Czar of Russia, residing at Brooklyn, in the county of Kings and State of New York, have invented new and useful Improvements in Coaster-Brakes, of which the following is a specification.

The general object of the invention is to overcome the braking effect which results from involuntary pressure on the ascending pedal of a bicycle provided with a coaster-brake when the rider is ascending a hill. And to this end the invention resides in providing a coaster-brake attachment with a lock which when adjusted into one position effects the locking of the friction clutch against movement under back pressure transmitted from the pedals.

Other objects will appear and be better understood from that embodiment of the invention of which the following is a specification. Reference being had to the accompanying drawings forming parts thereof and in which:—

Figure 1 is a side elevation of a coaster-brake provided with my invention. Fig. 2 is a sectional elevation on the line 2—2 of Fig. 1. Fig. 3 is a detail perspective of the bushing. Fig. 4 is a detail perspective of a section of the lock operating element and Fig. 5 is a detail perspective of one of the lock bolts. Fig. 6 is a longitudinal sectional view of the brake.

In the drawings 5 indicates the barrel, 6 the hub for the sprocket 7, which hub is arranged in one end of the barrel 5, 8 the friction clutch hub arranged in the other end of the barrel 5, 9 the axle which extends loosely through the barrel and the hubs 6 and 8 and which is provided with suitable nuts 10—10 for securing the rear forks (not shown). These elements make up the usual parts of the ordinary coaster-brake. The bushing shown in detail in Fig. 3, and indicated by 11, operates when turning movement in one direction is transmitted to the sprocket 7 to free the hub 6 from the barrel 5. The bushing 11 which is splined in the barrel 5 as usual, is connected by screw threads to the axle 9, as usual and is arranged for effecting an operative connection between the hub 6 and the barrel 5 when the sprocket 7 turns in one direction, and for rendering this connection ineffective and operating the clutch element in the hub 8 when the sprocket wheel is turned in the opposite direction.

Now it is well known that in the act of ascending a hill, the rider of the bicycle having a coaster-brake operating as just described, involuntarily presses on the ascending pedal, and while such involuntary pressure is never sufficient to obtain the full efficiency of the coaster-brake, it nevertheless operates the coaster-brake to produce a degree of binding which renders hill climbing harder to the rider than in cases where the coaster-brake is not used. Obviously this defect in coaster-brakes is produced by the longitudinal movement of the bushing 11 in an undesired direction which is effected by the said back pressure on the pedals successively. With the use of the present invention, the retarding effect resulting from the said back pressure may be entirely overcome, and this is effected by locking the bushing 11 to the barrel 5 which, as will be obvious when the parts are so locked renders the coaster-brake entirely inoperative as such and thereby conditions the bicycle to the class of those not having coaster-brakes. In the present instance this locking of the bushing is effected by means of spring pressed lock bolts 12—12 arranged in radially disposed casings 13—13 formed integral with the barrel 5; and oppositely disposed keepers in the form of recesses 14—14 in the flared end portion of bushing 11. The operation of the bolts 12—12 is controlled by the controller in the form of a circle made up of sections 15—15 which are fastened together by screws 16—16 and which are passed through slots 17—17 in the casings 13—13, and through slots 18 in the bolts 12. The controller 15 is provided with recesses 19—19 and operating handles 20—20. Radial guides in the form of lugs 21—21 are formed with the barrel 5 and arranged for receiving the controller 15 and for coöperating with the casings 13—13 to prevent lateral movement of the controller 15. The springs 22 which operate the bolts 12 to move in one direction, are arranged in chambers 23, in the bolts 12.

The slots 17 in the casings 13, and those in the bolts 12 correspond in length approximately to the widths of the sections of the controller 15 except at those portions of the sections where the recesses are formed.

Now by having the length of the springs 22 so proportioned to the corresponding dimensions of the chambers 23 as to obtain a compression or tensioning of the springs when their outer ends are in alinement with the inner ends of the slots 17 and 18, it will be obvious that the springs will move the bolts inwardly and into the keepers 14 when these are in alinement with the bolts, upon turning the controller 15 so as to bring the detents thereof into slots 18 of the bolts 12. This turning of the controller is effected by inserting the fingers between the spokes 24 and then taking hold of one of the handles 20—20, and turning the controller in the required direction. The relative positions of the handles 20 and lugs 21 are such that the handles will engage the lugs when the recessed portions of the controller are in the slots of the bolts, thus the lugs serve as stops. In the opposite direction such turning movement is continued until the handles 20 engage the casings 13 whereupon the parts will occupy the positions shown in Fig. 2, and permit the coaster-brake to operate in the ordinary manner.

What is claimed as new is:

1. In the coaster-brake the combination with the barrel and the pedal operated clutch mechanism for operatively connecting and for disconnecting the barrel with the pedals; of means arranged on the barrel and adapted for positively locking the clutch mechanism and the barrel together whereby to render the coaster-brake inoperative as such.

2. In the coaster-brake the combination with the barrel and the pedal operated clutch mechanism for operatively connecting and for disconnecting the barrel with the pedals; of detachable means arranged on one of the parts, and adapted when adjusted into one position to positively lock the barrel and clutch mechanism one to the other whereby to render the coaster-brake inoperative as such.

In testimony whereof I affix my signature in presence of two witnesses.

ABRAHAM ELKIN.

Witnesses:
 ISIDOR FINE,
 ISAAC YOPPLE.

Copies of this patent may be obtained for five cents each, by addressing the "Commissioner of Patents, Washington, D. C."